United States Patent Office 3,624,866
Patented Dec. 7, 1971

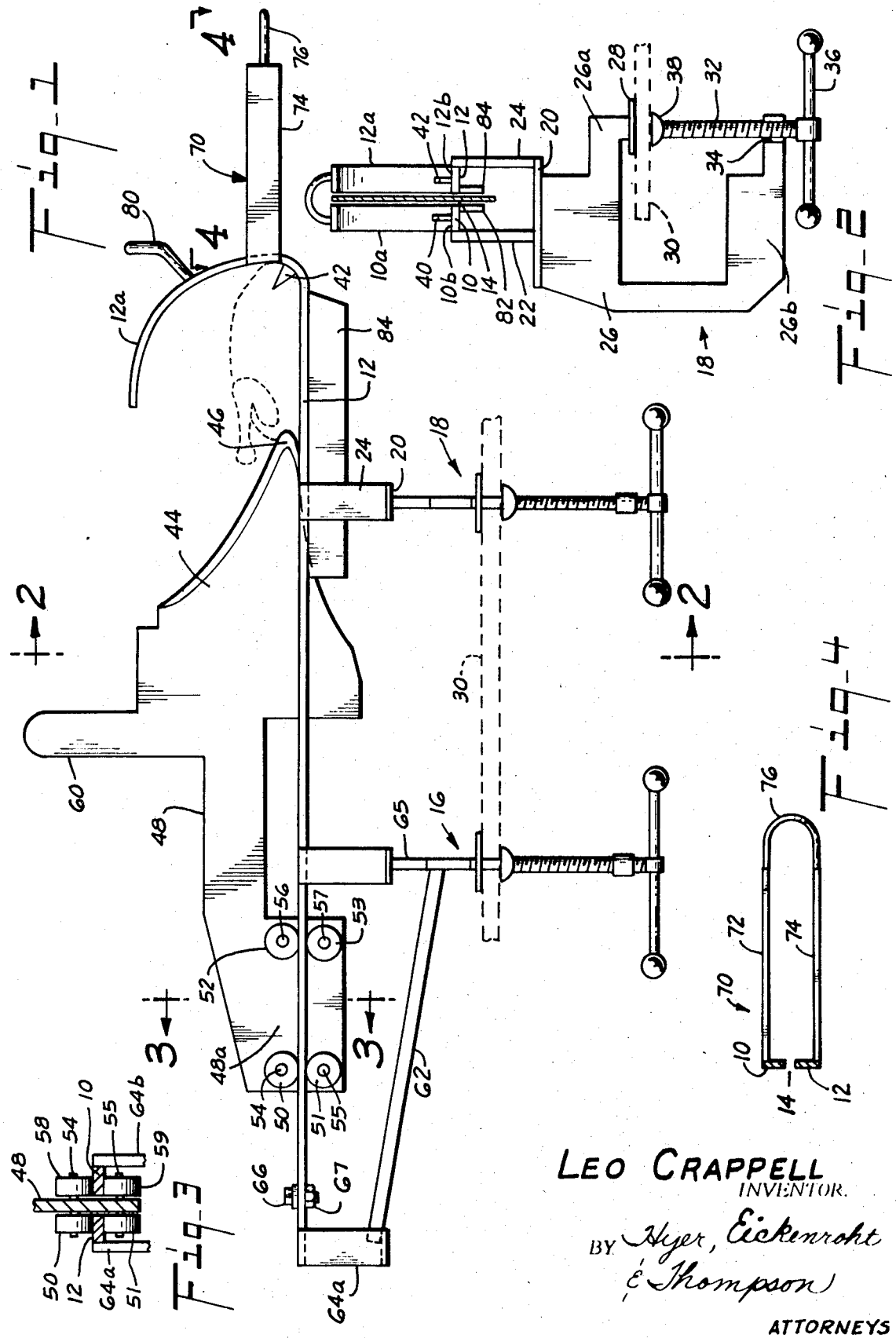

3,624,866
APPARATUS FOR BISECTING A FOWL
Leo Crappell, 102 Canal Drive, Franklin, La. 70538
Filed Dec. 9, 1969, Ser. No. 883,563
Int. Cl. A22c 21/00
U.S. Cl. 17—11                                    5 Claims

ABSTRACT OF THE DISCLOSURE

The apparatus includes a base having a surface upon which the fowl to be bisected can be positioned and held against movement along the surface in one direction. A wedge-shaped knife blade is mounted for movement along the supporting surface with a portion of the blade extending into a longitudinally extending slot in the base. The forward, narrow end of the knife blade enters the vent of the fowl and bisects it as the blade moves parallel to the supporting surface.

---

This invention relates to improvements in apparatus for cutting up a fowl, such as a chicken, and in particular to improvements in apparatus for bisecting a fowl.

It is an object of this invention to provide improved apparatus for cutting fowls into pieces convenient for cooking quickly and easily.

It is another object of this invention to provide fowl cutting apparatus that is easy to use that is safe, and that employs few parts.

It is a further object of this invention to provide apparatus for bisecting a fowl that cuts through the back and breast of the fowl at the same time and thereby imposes substantially no unbalanced forces upwardly or downwardly on the fowl during the bisecting operation.

It is a further object of this invention to provide apparatus for bisecting a fowl that permits the fowl to be easily and quickly placed in position for bisecting.

These and other objects, advantages and features of this invention will be apparent to those skilled in the art from a consideration of this specification including the attached drawings and appended claims.

The preferred embodiment of the invention will now be described by way of an example. This embodiment is shown in the attached drawings, in which, FIG. 1 is a side view of the fowl bisecting apparatus;
FIG. 2 is a cross sectional view of the apparatus of FIG. 1 taken along line 2—2;
FIG. 3 is a cross sectional view of the apparatus of FIG. 1 taken along line 3—3; and
FIG. 4 is a view of the apparatus of FIG. 1 taken along line 4—4 of FIG. 1.

The apparatus includes a base having a surface upon which the fowl can be supported. In the embodiment shown, the base includes elongated fowl supporting members 10 and 12, and clamp assemblies 16 and 18. Members 10 and 12 are rectangular in cross section and are positioned in parallel relationship, as shown in FIG. 2, so their upper surfaces 10b and 12b provide support for a fowl. The members are spaced apart to form slot 14 between them, which extends longitudinally of the members and the base.

Members 10 and 12 are supported in such parallel, spaced, relationship by clamp assemblies 16 and 18. These assemblies are identical in structure, so only one will be described in detail. In FIG. 2, a side view of clamp assembly 18 is shown. Members 10 and 12 are connected to horizontal supporting plate 20 by upright post members 22 and 24. Post member 22 supports member 10 and post member 24 supports member 12, respectively, in their spaced parallel relationship. The posts can be connected to the two members and to support plate 20 in any convenient manner, such as by welding.

Clamp plate 26 is connected to support plate 20 and is C-shaped, having upper leg 26a and lower leg 26b. Upper leg 26a has flat plate 28 attached to it in position to engage the top of table 30 shown dotted in the drawing. Lower leg 26b supports threaded rod portion 32 of the clamp. The rod extends through threaded hole 34 in leg 26b so that rotation of the rod by handle 36 will move clamp member 38 on the end of the rod into and out of engagement with the underside of table 30. By tighting up on the clamp so that a table, bench, shelf, or the like is securely held between the clamp plate and the rod, the base of the apparatus will be solidly supported on the table. Clamp means are used for this purpose so the apparatus can be attached to any convenient work surface. For permanent mounting of the apparatus, other means can be used.

Stop means are provided for limiting the movement in one direction of the fowl on the upper surfaces of support members 10 and 12. In the embodiment shown, members 10 and 12 have ends 10a and 12a that are bent upwardly to hold a fowl shown dotted in FIG. 1 from moving to the right once it is positioned on supporting surfaces 10b and 12b of members 10 and 12 and in engagement with the upturned ends 10a and 12a. In the embodiment shown, these upturned ends curve backwardly over the fowl and as will be explained below, act as additional guides for the knife blade employed to cut the fowl in half. To further insure that the fowl is held in position on the support surface, barbs 40 and 42 are attached to support members 10 and 12 adjacent the point where these members turn upwardly. Preferably, the barbs are positioned to extend into the neck opening of the fowl, and in this way, do a minimum of damage to the meat while holding the bird against lateral movement on the supporting surface of the base members.

The apparatus also includes wedge shaped knife blade 44 having a narrow or pointed forward end 46. The forward edges of the blade that diverge rearwardly from the narrow forward end are sharpened to provide cutting edges that diverge rearwardly and that will progressively cut through the breast and back of a fowl as the blade is moved to the right.

Means are provided to mount the knife blade for movement parallel to the supporting surface of the base with a portion of the blade extending into the slot in the base and the narrow forward end of the blade facing the stop means. In the embodiment shown, knife blade 44 is integrally attached to knife support member or plate 48. A plurality of rollers are mounted on plate 48 to support the plate and knife blade for movement longitudinally along and parallel to the supporting surface of the base. In the embodiment shown, two pairs of rollers are positioned on each side of guide portion 48a of member 48. Rollers 50 and 51 are mounted for rotation on shafts 54 and 55. Rollers 52 and 53 are mounted for rotation on shafts 56 and 57. Both pairs of rollers are spaced apart to receive between them support member 12. Preferably, they engage the member with a minimum of clearance. On the other side of portion 48a from the side shown in FIG. 1, a similar arrangement of rollers is provided to engage support member 10. One pair, rollers 58 and 59, is shown in FIG. 3. Shafts 54 and 55 extend through guide portion 48a of the knife support plate and support rollers 58 and 59, respectively. The same is true of shafts 56 and 57 although the rollers they support are not shown. Members 10 and 12 act as rails that support and guide the knife plate and knife through the rollers for movement parallel to the supporting surface of the base. Rear portion 48a of knife support plate 48 also extends into slot 14 between members 10 and 12 and guides the rearward part of the knife plate as it is moved longitudinally along the surface of the support.

Handle 60 is also integrally attached to knife support blade 48, in the embodiment shown. A person operating the apparatus can use the handle to move the knife blade through a fowl and return it into position to bisect another fowl.

Since the knife blade is supported by the rollers in a cantilevered manner, there is a turning moment imposed on members 10 and 12. To provide rigidity to the support members and help them resist this turning moment, rod 62 is connected at one end to support members 10 and 12 by plates 64a and 64b. The other end of the rod is connected to clamp plate 65 of clamp assembly 16.

Stop means are also provided to limit the distance the knife blade can be moved away from a fowl. In the embodiment shown, bolt 66 is positioned between the members in slot 14 and held in place by nut 67. The stop can be adjusted, as desired, by loosening the nut and moving the bolt to the desired position after which the nut is tightened again.

In operation, a fowl is placed on the upper surface of support members 10 and 12 with its vent facing forward end 46 of knife blade 44. Preferably, barbs 42 extend into the neck opening of the fowl to hold the fowl against lateral movement. The fowl then would be positioned at the forwardmost point on the support surface and held against further movement to the right, as viewed in FIG. 1, by upturned ends 10a and 12a of the support members. The operator then can move knife blade 44 to the right by handle 60. The narrow forward end of the knife will enter the vent of the fowl. As the knife progresses to the right, the diverging cutting edges will exert upward and downward cutting forces on the carcass. These forces are generally balanced since they are in opposite directions. The knife then will bisect the fowl as the knife travels to the right and the diverging cutting edges on the knife blade progressively cut through the breast and back of the fowl. The knife blade will extend some distance beyond members 10 and 12 when it has severed the fowl in half. For this reason, knife guard 70 is attached to members 10 and 12 and positioned to enclose the forward end of the knife blade and protect the operator should be be pulling the knife toward him. Knife guard 70 comprises two rectangular plates 72 and 74 that are attached to members 10 and 12, respectively, as shown in FIG. 4. Arcuate bar 76 is connected between the members and positioned to limit the distance the blade can move to the right.

Generally, U-shaped bar 80 has its ends connected to the upturned portions of the support members 10 and 12 and guards the upper portion of the knife when it is in its forward position.

Stiffening members 82 and 84 are connected to the underside of fowl supporting members 10 and 12. These members add rigidity to the members as they guide the knife through the fowl.

From the foregoing description of one embodiment of this invention by way of example, it will be seen that this invention is one well adapted to attain all of the ends and objects hereinabove set forth, together with other advantages which are obvious and which are inherent to the apparatus and structure.

The invention having been described, what is claimed is:

1. Apparatus for bisecting a fowl comprising a base having a surface for supporting a fowl and stop means for limiting the movement of the fowl in one direction along the supporting surface, said base further having a slot extending longitudinally of the supporting surface, a wedge-shaped knife blade having a narrow forward end and cutting edges that diverge rearwardly from the forward end and means mounting the knife blade for movement parallel to the supporting surface with a portion of the blade extending into the slot on the surface and the narrow forward end of the blade facing the stop means, said knife being positioned to enter the vent of a fowl positioned on the surface to bisect the fowl as the knife travels toward and past the stop means.

2. The apparatus of claim 1 in which the base comprises two parallel members having upper surfaces for supporting a fowl, said members being spaced apart to form said slot into which said portion of the knife blade extends.

3. The apparatus of claim 2 in which the members have upturned ends that provide the stop means for limiting the distance a fowl can move in one direction on the base.

4. The apparatus of claim 3 further provided with at least one sharply pointed barb attached to one of the support members adjacent the upturned end thereof upon which a fowl may be skewered.

5. Apparatus for cutting in half a fowl, such as a chicken, comprising two elongated spaced parallel members having upturned ends to form a pocket to receive and support a fowl with its vent facing away from the upturned ends, a wedge-shaped knife blade having a narrow forward end, and means mounting the knife blade for movement parallel to the members with a portion of the knife blade extending between the members and its narrow forward end facing the upturned ends of the members to enter the vent of the fowl when the knife blade is moved toward the upturned ends of the members and cut the fowl in half by cutting through the back and breast of the fowl as in the knife blade moves toward the upturned ends of the members.

References Cited
UNITED STATES PATENTS

| 2,729,848 | 1/1956 | Celillo | 17—11 |
| 2,807,046 | 9/1957 | Hebenheimer | 17—11 |
| 3,130,445 | 4/1964 | Segur | 17—11 X |

FOREIGN PATENTS

| 1,429,817 | 4/1969 | Germany. | |

LUCIE H. LAUDENSLAGER, Primary Examiner